United States Patent [19]
Ishii et al.

[11] 3,760,405
[45] Sept. 18, 1973

[54] CHARACTER DISPLAY SYSTEM UTILIZING CIRCULATING MEMORIES

[75] Inventors: Atsushi Ishii, Kawasaki; Masayuki Murakami, Yokohama; Yoichi Hagiwara, Kawasaki; Tomio Ono, Tokyo; Kiyoshi Adachi, Kawasaki; Shuji Hashimoto, Chiba, all of Japan

[73] Assignee: Fujitsu Limited, Kawasaki, Japan

[22] Filed: Dec. 20, 1971

[21] Appl. No.: 209,965

[30] Foreign Application Priority Data

Dec. 24, 1970 Japan ............................ 45/118083

[52] U.S. Cl. .................... 340/324 AD, 340/366 CA
[51] Int. Cl. ............................................ G06f 3/14
[58] Field of Search ................ 340/324 A, 324 AD, 340/366 CA, 172.5

[56] References Cited

UNITED STATES PATENTS

| | | | |
|---|---|---|---|
| 3,505,665 | 4/1970 | Lasoff et al. | 340/324 AD |
| 3,582,936 | 6/1971 | Kite et al. | 340/324 AD |
| 3,076,119 | 1/1963 | Fluhr | 340/324 A |
| 3,466,645 | 9/1969 | Granberg et al. | 340/324 AD |

*Primary Examiner*—John W. Caldwell
*Assistant Examiner*—Marshall M. Curtis
*Attorney*—Lerner & Wilfond

[57] ABSTRACT

In a character display system having an electronic computer for providing code informations, a keyboard provides input informations. A control arrangement couples the computer and the keyboard to a display system. The control arrangement comprises a circulating memory coupled to the computer and the keyboard for storing informations from the computer and from the keyboard. First and second marker signal circulating memories circulate first and second marker signals synchronously with the circulating memory. Delimiting signals for delimiting the computer are supplied from the keyboard. The first and second marker signal circulating memories are adapted to be used independently by the delimiting signals.

3 Claims, 6 Drawing Figures

CHARACTER DISPLAY SYSTEM UTILIZING CIRCULATING MEMORIES

The present invention relates to a control circuit for a character display system. More particularly, the invention relates to a control circuit for a character display system which is able to process input informations from a keyboard and an electronic computer without disturbing the display position.

An object of the invention is to provide a character display system which overcomes the disadvantages of known character display systems.

Another object of the invention is to provide a character display system which prevents a reduction in the processing speed of the computer.

Still another object of the invention is to provide a character display system which does not require that the memory capacity of the computer be increased.

Another object of the invention is to provide a character display system which permits the keyboard operator to operate the keyboard without disturbance.

Still another object of the invention is to provide a character display system of simple structure which functions with efficiency,effectiveness and reliability.

In accordance with the invention, a curson use memory and an address pointer use memory are utilized independently in accordance with whether the informations are supplied from the computer or from the keyboard. The marker of one input information is thus not moved by other input informations, so that the operator may operate the keyboard without disturbance.

In accordance with the invention, the character display system comprises a circulating memory for accumulating or storing the marker signals. The circulating marker for storing the marker signals is set independently of the marker signals supplied by the computer to the control circuit and independently of the marker signals supplied by the keyboard to the control circuit. The circulating memory is utilized by switching the bit information which indicates to which unit of the two, which are the computer and the keyboard, the display system corresponds. The marker signals from the computer to the control circuit are hereinafter referred to as the address pointer signals and the marker signals from the keyboard to the control circuit are hereinafter referred to as the cursor signals.

In accordance with the invention, in a character display having an electronic computer for providing code informations, a keyboard for providing input informations, and a display system, a control arrangement coupling the computer and the keyboard to the display system comprises circulating memory means coupled to the computer and the keyboard for storing informations from the computer and from the keyboard. First and second market signal circulating memories circulate first and second marker signals synchronously with the circulating memory means. Delimiting signals are supplied for delimiting the computer from the keyboard. The first and second marker signal circulating memories are adapted to be used independently by the delimiting signals.

Gate means connected to the first and second marker signal circulating memories controls the restorage of marker signals to be circulated. The delimiting signals are supplied to the gate means for controlling the conductive condition of the gate means. The delimiting signals are "1" and "0" and are supplied to the gate means of one of the first and second marker signal circulating memories via an inverter. The inverter signals to be circulated are restored when the delimiting signal "1" is transferred by each of the gate means.

In order that the invention may be readily carried into effect, it will now be described with reference to the accompanying drawings, wherein.

Figure 3A:
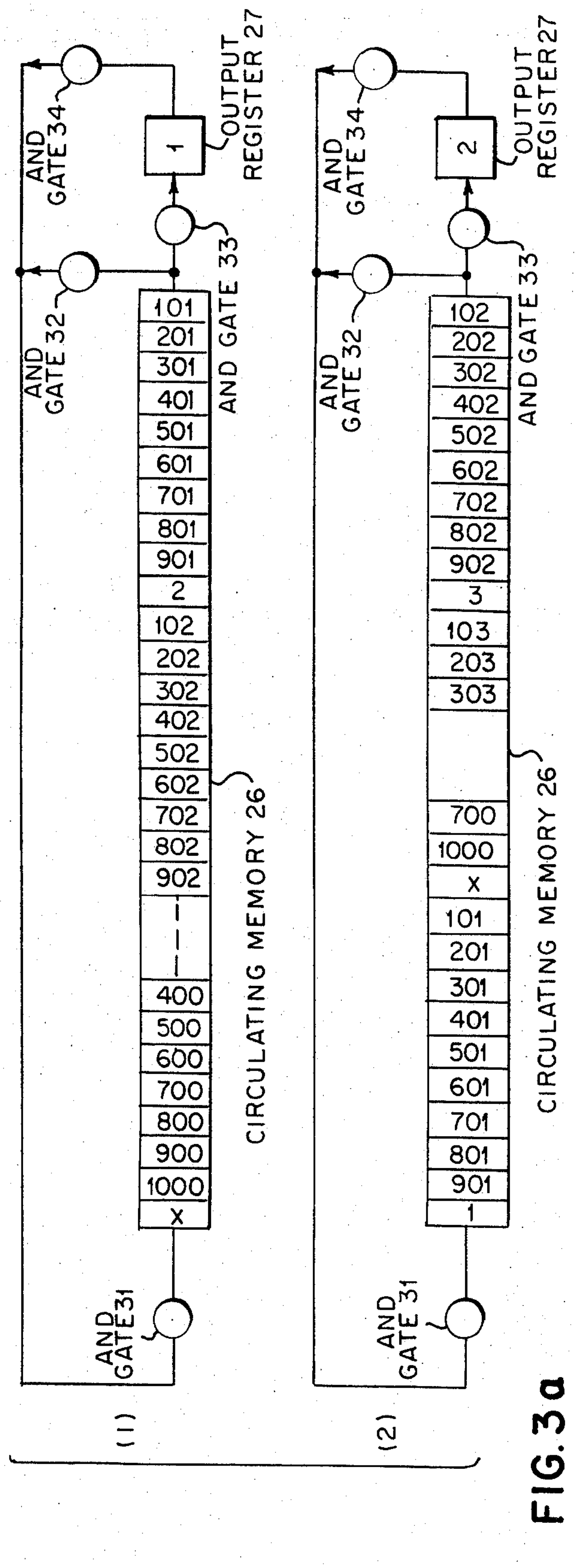
Figure 3B:
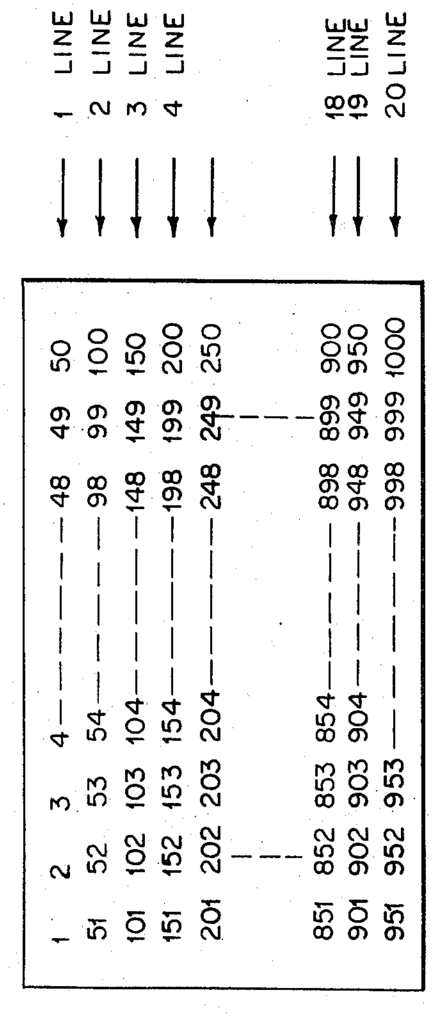

FIG. 3*a* is a block diagram illustrating the movement of informations in a circulating memory and output register;

FIG. 3*b* is an illustration of the display surface; and

Figure 4A:
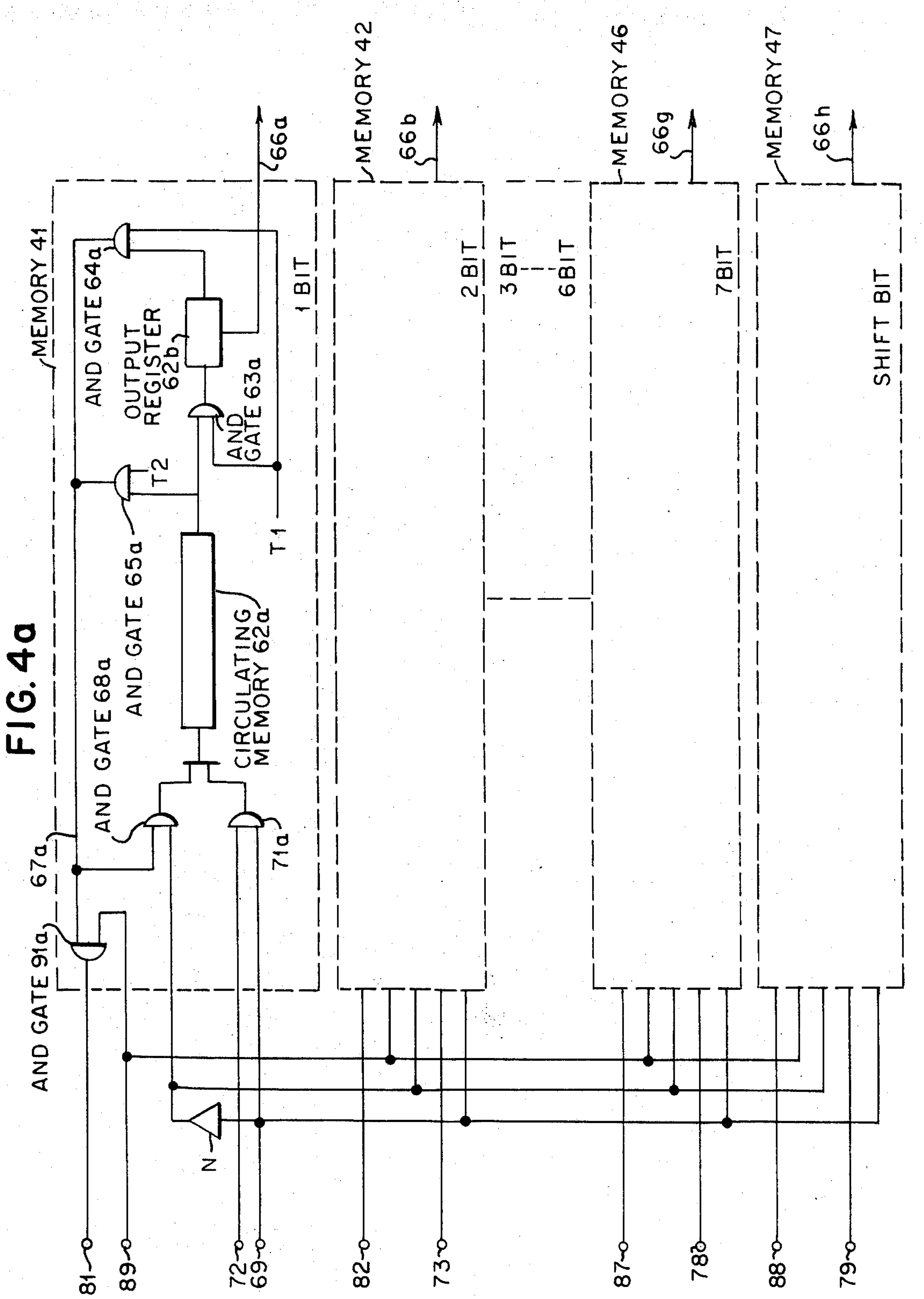
Figure 4B:
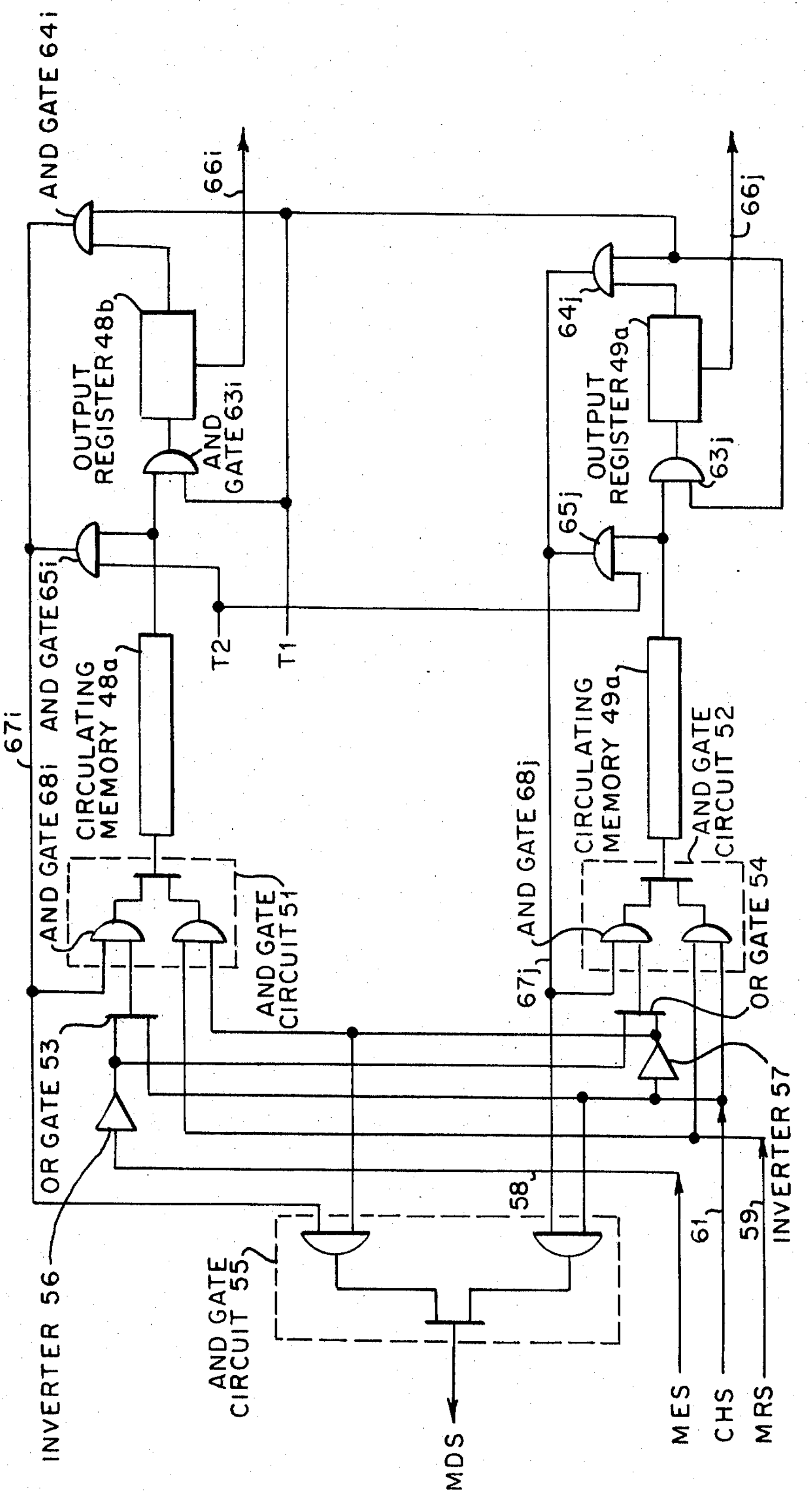

FIGS. 4*a* and 4*b* are block diagrams of a circulating memory and an output register of the control circuit arrangement of the present invention.

Figure 1:
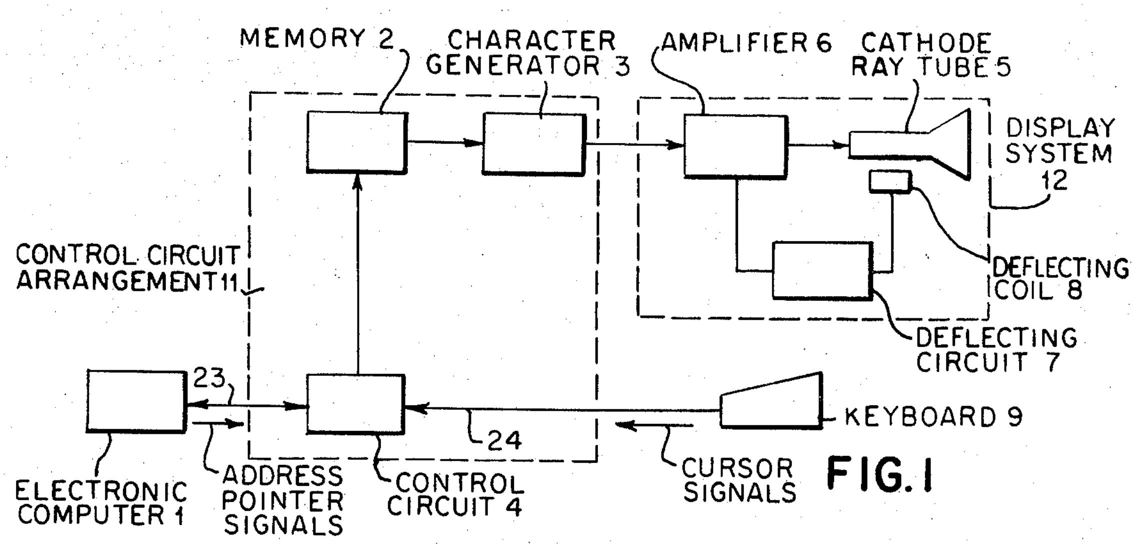
FIG. 1 is a block diagram of a character display system of the type of the invention.

A character display system of the type of the invention functions to display a character, numerical or symbolic pattern on a display surface of a cathode ray tube in accordance with input informations from an electronic computer or a keyboard. FIG. 1 shows a character display system of this type. In FIG. 1, an electronic computer 1 supplies code informations to a memory 2 and a character generator 3 via a control circuit 4. The code informations from the computer 1 are converted into character pattern signals corresponding to the code informations at the character generator 3.

The character pattern signals are supplied by the character generator 3 to a cathode ray tube 5 via an amplifier 6. The display surface of the cathode ray tube 5 indicates the character, numeral, symbol, pattern, or the like, corresponding to the character pattern signals. A deflecting circuit 7 is connected between the amplifier 6 and a deflecting coil or winding 8 of the cathode ray tube 5. The deflecting circuit 7 supplies deflection signals corresponding to the character pattern signals to the deflecting coil 8. The memory 2 is a circulating memory comprising a shift register, delay lines, etc. The memory 2 supplies code informations repeatedly to the character generator 3 and simultaneously feeds back to the input.

A keyboard 9 supplies code informations controlling the erasure, correction and designation of positions of the display character on the display surface of the cathode ray tube 5. The supply of the code informations from the keyboard 9 to the control circuit 4 is in the same manner as the supply of informations from the computer 1. The characters corresponding to the code informations supplied from the computer 1 are usually displayed in sequence.

The positions where the characters are displayed are indicated by a marker which is usually called a curson or a pointer. The marker is moved automatically to the position for displaying the next character. In other words, the marker signals designate the display position and are accumulated or stored in the circulating memory. When the characters are displayed in sequence and if the characters corresponding to the code informations at the position where the marker signals are accumulated are displayed, the marker signals are automatically moved to the position where the code informations corresponding to the next character to be displayed are accumulated.

Thus, at the time of display of the next character the marker signals among the contents of the circulating memory are retrieved and only the code informations at the positions where the marker signals are accumulated are fed to the character generator 3 and are converted into the pattern signal in said character generator. The corresponding characters are displayed.

The editing operations for composing a sentence by the informations supplied from the keyboard 9 and the transfer of the sentence composed to the computer 1 are provided on the display surface of the cathode ray tube 5. In this case, the keyboard operator moves the marker signals in the circulating memory by a function switch in the keyboard 9 to carry out the designation of the optional character or line. This means that the movement of the marker signals in the circulating memory and the designation of the characters of code information at the positions corresponding to the marker signals are simultaneously performed.

When the editing operations such as the composition of the sentence are completed, the code informations corresponding to the postions of the marker signals are transferred to the computer 1 by operating another function switch in the keyboard 9. However, if the movement of the marker signal under the control of the keyboard 9 is undertaken while the characters corresponding to the code informations from the computer 1 are displayed by the cathode ray tube 5, problems arise due to the fact that the marker signals are moved and the characters to be displayed sequentially are displayed at scattered positions on the display surface.

The conventional control systems are thus not permitted to process the input informations from the keyboard 9 while the code informations from the computer 1 are being processed. From this point of view, a problem arises regarding the operating time of the keyboard 9 by the keybaord operator when the processing speed of the computer 1 becomes faster and the reception and transmission of informations by the computer and the display system are increased. If the keyboard 9 is being operated when the informations from the computer 1 are supplied to the display system, a defect arises since said informations must be accumulated in said computer. This causes the reduction of the processing speed of the computer 1, necessitating the increase in the memory or storage capacity of said computer.

Figure 2:
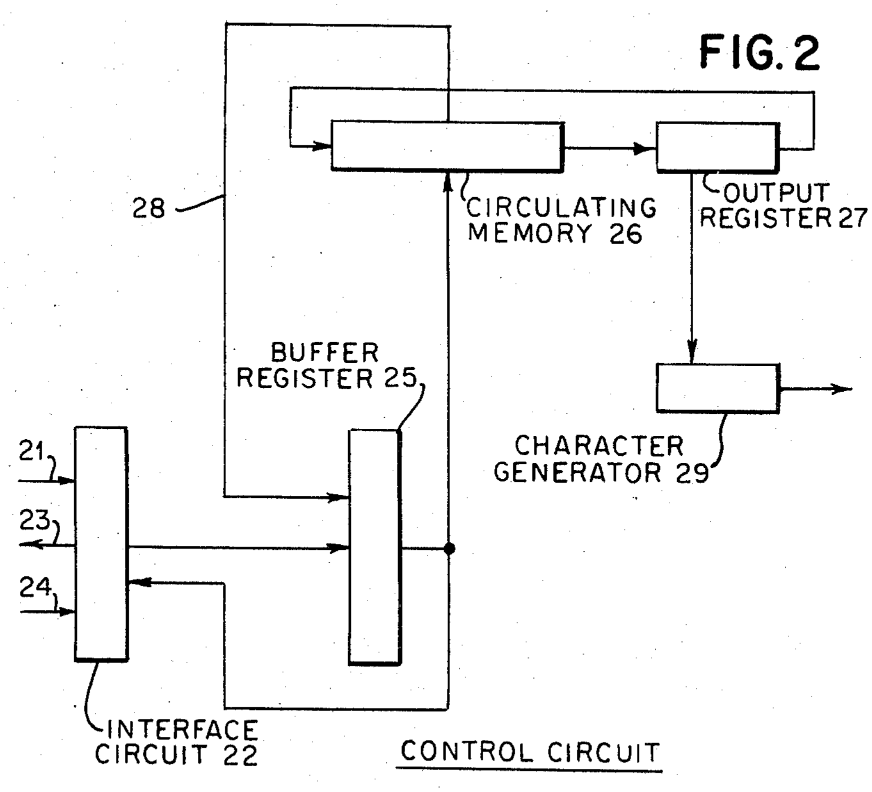
FIG. 2 is a block diagram of the control circuit of the character display system of FIG. 1.

FIG. 2 shows the control circuit arrangement 11 of the present invention as utilized in the character display system of FIG. 1. In FIG. 2, an input lead or line 21 connects an input control system (not shown in FIG. 2) to an interface circuit 22. An output lead or line 23 connects an output control system (not shown in FIG. 2) to the interface circuit 22. The input and output control systems are connected between the computer 1 and the display system (FIG. 1). A lead or line 24 is connected to the keyboard 9 of FIG. 1.

A buffer register 25 has an input connected to the output of the interface circuit 22 and accumulates or stores part of the code informations for one character. The buffer register 25 has an output connected to an input of a circulating memory 26 and back to an input of the interface circuit 22. The circulating memory 26 has an output connected to an output register 27 and an output connected to another input of the buffer register 25 via a lead or line 28. The output register 27 has an output connected to an input of the circulating memory 26 and an output connected to the input of a character generator 29. The character generator 29 has an output which is connected to a diode matrix or monoscope of known type (not shown in FIG. 2). The information code from the input lines 21 and 24 is stored in the buffer register 25 via the interface circuit 22.

The circulating memory 26 always circulates and detects the marker signals. When the marker signals are detected, the code informations stored in the buffer register 25 are to be stored in the circulating memory 26. When the interface circuit 22 is supplied with a designation for transferring the informations received via the line 24, the code informations at the positions corresponding to the marker signals stored in the buffer register 25 via the line 28 are transferred to the computer 1 via the lead 23.

FIG. 3*a* illustrates the relation between the information stored in the circulating memory 26 and the output register 27 of FIG. 2 and FIG. 3*b* illustrates a display picture appearing on the display surface of the cathode ray tube 5. The numbers in FIG. 3*b* represent the display positions and the numbers in FIG. 3*a* show the positions corresponding to the display positions. FIG. 3*a* show two conditions, 1 and 2, of the circulating memory 26 and the output register 27 of FIG. 2.

The condition 1 of FIG. 3*a* indicates that the characters are displayed at the display position [1] of the output register 27. The condition 2 of FIG. 3*a* indicates that the characters are displayed at the display position [2] of the output register 27. An AND gate 31 and an AND gate 32 are connected in series with the circulating memory 26 in a closed loop therewith. An AND gate 33 is connected in series between the output of the circulating memory 26 and the input of the output register 27. An AND gate 34 is connected in series circuit arrangement with the AND gate 33 and the output register 27, the series circuit arrangement being connected in parallel with the AND gate 32.

When the characters are displayed, the AND gates 31 and 32 are in their open or conductive condition. The numbers 101 to 901 in the circulating memory 26 are thus fed back sequentially and are stored again. Next, when the display position [2] is varied from the condition at the head of the circulating memory 26 to the condition 2 of FIG. 3*a*, the AND gates 31 and 32 are switched to their closed or non-conductive condition and the AND gates 33 and 34 are switched to their open or conductive condition. The display position [1] is thus stored behind 901 and the display position [2] is transferred to the output register 27. The AND gates 31, 32, 33 and 34 are simultaneously reversed in condition to commence the display of characters at the second display position. The aforedescribed operations are repeated sequentially. The code information consists of seven bits for information and one shift bit, totaling eight bits. Therefore, as shown in FIG. 4*a*, eight bits are stored by setting each bit in parallel. A plurality of memories 41 to 47 are set to store the code information for one picture portion. The memories 41 to 47 are identical.

FIG. 4*b* shows the configuration of circulating memories **48*a* and 49*b* and output registers 48*b* and 49*b*. The circulating memories 48*a* and 49*a* are independently set for the curson and the output registers 48*b* and 49*b*** are independently set for the address pointer, in accordance with the invention.

Prior to the present invention, a single circulating memory and a single output register were set for common use for the curson and the address pointer. That is, in FIG. 4*b*, AND gate circuits 51 and 52 write in continuously the marker signals of the circulating memories 48*a* and 49*a* and function to erase and write in the marker signals by writing in the informations from the outside. An OR gate 53 is connected to the input of the AND gate circuit 51 and an OR gate 54 is connected to the input of the AND gate circuit 52. An AND gate circuit 55 transfers the marker detection signal and is coupled to the OR gate 53 via an inverter 56 and to the OR gate 54 via an inverter 57. Each of the AND gate circuits 51, 52 and 55 comprises two AND gates and an OR gate, the inputs of the OR gate being the outputs of the AND gates.

The AND gate circuit 55 supplies a marker detection signal MDS. A marker signal erase signal is supplied to the AND gate circuit 51 via a lead or line 58, the inverter 56 and the OR gate 53 and is supplied to the AND gate circuit 52 via said lead, said inverter and the OR gate 54. A marker write in signal MRS is supplied to both AND gate circuits 51 and 52 via a lead or line 59. A change delimiter signal CHS is applied to the AND gate circuit 51 via a lead 61 and the OR gate 53 and is supplied to the AND gate circuit 52 via the lead 61 and via said lead, the inverter 57 and the OR gate 54. The last change delimiter signal serves to determine whether the informations to be stored are from the keyboard 9 or from the computer 1 (FIG. 1). The informations from the computer 1 are designated "1" and the informations from the keyboard 9 are designated "0," for example. Furthermore, circulating memories 62*a* to 49*a* and output registers 62*b* to 49*b* of FIGS. 4 *a* and 4*b* are shifted in synchronism with each other.

When the informations in the circulating memories are sequentially displayed, AND gates 63*a* to 63*j* and 64*a* to 64*j* are switched to their open or conductive condition by a time signal T1 and the code informations to be displayed in the output registers 62*b* to 49*b* are stored. Then, when the time signal T1 terminates, and a time signal T2 is provided, the AND gates 63*a* to 63*j* and the AND gates 64*a* to 64*j* are switched to their closed or non-conductive condition and the ANd gates 65*a* to 65*j* are switched to their open or conductive condition. The code informations are supplied to the character generator 29 (FIG. 2) via leads or lines 66*a* to 66*j* to provide the display.

During the display via the AND gates 65*a* to 65*j*, the contents of the circulating memories 48*a* and 49*a* are circulated via back lines or leads 67*a* to 67*j*. At this time, the change delimiter signal CHS, as hereinbefore mentioned, becomes "1." This is determined to be "1" because the code informations are not fed from the keyboard 9 (FIG. 1) through a control circuit. Therefore, the AND gate circuit 55 operates so that it is switched to its open or conductive condition if the address pointer bit which appears on the back line 67*j* and the marker detection signal MDS is provided at the output of said AND gate circuit. Then, when the marker detection signals MDS are detected by a control circuit (not shown in the FIGS.), the marker erase signals MES are supplied at the input. Therefore, an AND gate 68*j* is switched to its closed or non-conductive condition and prevents the transfer of the address pointer bit appearing on the back line BLj, so that said address pointer bit is prevented from being stored again in the circulating memory 49*a*. The AND gate 68*j* is part of the AND gate circuit 52 of FIG. 4*b*.

The AND gate 68*j* is thus in its conductive condition until the marker erase signal MES is supplied. During such time, however, the address pointer bit is not stored again in the circulating memory 49*a*. This is because the circulating memories 62*a* to 49*a*, which comprise 10 circulating memories, all utilize a dynamic shift register, so that it is necessary to provide a clock, and even when the marker erase signal MES is not supplied to the input, there is not another storage unless the clock is provided. When the AND gate 68*j* of the AND gate circuit 52 is switched to its closed or non-conductive condition by the marker erase signal MES before the clock is provided, the address pointer bit is not stored again, regardless of when the clock is provided. The marker write in signal is supplied at the input through a control circuit to the next time instant at which the marker erase signal MES is supplied at the input. The address pointer bits are stored after transfer through the AND gate circuit 52.

It thus follows that the address pointer bits in the circulating memory 49*a* are stored in storage positions corresponding to the positions shifted for 1 display position and set to be displayed next. It is considered that in the process of repetition of such movements, the code informations from the keyboard 9 (FIG. 1) are stored in the circulating memories 62*a* to 62*h* (FIG. 4*a*) corresponding to the storage positions of the curson signals stored in the circulating memory 48*a*. At this time, the change delimiter signal CHS becomes "0" and the AND gate circuit 55 is switched to its conductive condition so that it transfers the marker detection signal MDS in code with the cursor signal bit via the back line 67*a*. The bits which indicate the external information input from a control circuit are then supplied as the input to an input terminal 69 of FIG. 4*a*.

After the bits indicating the external information input from a control circuit are supplied to the input terminal 69, the AND gates 68*a* to 68*h* are switched to their closed or non-conductive condition and AND gates 71*a* to 71*h* are switched to their open or conductive condition. The code informations of eight bits supplied from the keyboard 9 (FIG. 1) are supplied in parallel as inputs to input terminals 72, 73, 74 (not shown in FIG. 4*a*), 75 (not shown in FIG. 4*a*), 76 (not shown in FIG. 4*a*), 77 (not shown in FIG. 4*a*), 78 and 79 of FIG. 4*a*. The code informations from the keyboard 9 are stored in the circulating memories 62*a* to 62*h* (FIG. 4*a*) in place of the code informations appearing on the back lines 67*a* to 67*h* (FIG. 4*a*).

From the foregoing explanation, it is clearly understood that the aforedescribed storage positions correspond to the storage positions of the curson signals in the circulating memory 48*a* to perform the shift. Furthermore, at such time, the address pointer bits in the circulating memory 49*a* are stored again through the AND gate 68*j* of the AND gate circuit 52 without any change, so that the storage positions of the address pointer are not disturbed by supplying the code informations from the keyboard 9 as inputs. It thus follows that with the completion of the input supply of the code informations from the keyboard 9, the change delimiter signal CHS is changed to "1" and the characters corresponding to the code informations from the circulating memories 62*a* to 62*h* are to be displayed sequentially subsequent to the prior display positions in the aforedescribed manner. The circulating memories 62*a* to 62*h* are for information use. The circulating memory 48*a* is for cursor use. The circulating memory 49*a* is for address pointer use.

FIG. 4*a* includes output terminals 81, 82, 83 (not shown in FIG. 4*a*), 84 (not shown in FIG. 4*a*), 85 (not shown in FIG. 4*a*), 86 (not shown in FIG. 4*a*), 87 and 88. The output terminals 81 to 88 are the output terminals of the code informations to be supplied to the electronic computer 1 (FIG. 1). The bit for information feed control is supplied to an input terminal 89 in FIG. 4*a*. The bit for feed control is provided by a control circuit (not shown in the FIGS.). Thus, for example, by utilizing the marker erase signal MES and the marker write in signal MRS frequently, moving the storage positions of the cursor or the address pointer and supplying the feed control bit as an input to the input terminal 89, the code information circulating memories 62*a* to 62*h* corresponding to the storage positions of the moved cursor or address pointer bit are supplied to the computer 1 (FIG. 1) via AND gates 91*a* to 91*h* (FIG. 4*a*).

While the invention has been described by means of specific examples and in specific embodiment, it should not be limited thereto, for obvious modifications will occur to those skilled in the art without departing from the spirit and scope of the invention.

We claim:

1. In a character display system having an electronic computer for providing code informations, a keyboard for providing input informations, and a display system, a control arrangement coupling the computer and the keyboard to the display system and comprising circulating memory means coupled to the computer and the keyboard for storing informations from the computer and from the keyboard, first and second marker signal circulating memories for circulating first and second marker signals synchronously with the circulating memory means, and means for supplying delimiting signals for delimiting the computer from the keyboard, said first and second marker signal circulating memories being adapted to be used independently by said delimiting signals.

2. A control arrangement as claimed in claim 1, further comprising gate means connected to the first and second marker signal circulating memories for controlling the restorage of marker signals to be circulated, and means for supplying the delimiting signals to the gate means for controlling the conductive condition of the gate means.

3. A control arrangement as claimed in claim 2, further comprising an inverter, and wherein the delimiting signals are "1" and "0" and are supplied to the gate means of one of the first and second marker signal circulating memories via the inverter, the marker signals to be circulated being restored when the delimiting signal "1" is transferred by each of the gate means.

* * * * *